United States Patent [19]

Sabourin et al.

[11] Patent Number: 5,563,880
[45] Date of Patent: Oct. 8, 1996

[54] METHODS FOR MANAGING AND DISTRIBUTING PAYLOAD INSTRUCTIONS

[75] Inventors: Donald J. Sabourin, Mesa; John A. Grosberg, Scottsdale, both of Ariz.

[73] Assignee: Motorola, Inc., Schaumburg, Ill.

[21] Appl. No.: 349,273

[22] Filed: Dec. 5, 1994

[51] Int. Cl.$^6$ ................................. H04B 7/19; H04J 3/24
[52] U.S. Cl. ..................... 370/61; 370/94.1; 370/104.1;
                                                    342/352; 455/12.1
[58] Field of Search ................................. 370/17, 60, 60.1,
            370/61, 79, 85.13, 94.1, 94.2, 94.3, 95.1,
        95.3, 100.1, 104.1, 85.3; 379/58, 61; 455/11.1,
                            12.1, 13.1, 13.2; 342/352, 356

[56] References Cited

U.S. PATENT DOCUMENTS

| | | | |
|---|---|---|---|
| 4,875,208 | 10/1989 | Furuhashi et al. | 370/94.1 |
| 4,939,725 | 7/1990 | Matsuda et al. | 370/85.3 |
| 4,939,726 | 7/1990 | Flammer et al. | 370/94.1 |
| 5,065,398 | 11/1991 | Takashima | 370/94.1 |
| 5,216,670 | 6/1993 | Ofek et al. | 370/94.1 |
| 5,365,520 | 11/1994 | Wang et al. | 370/60 |

*Primary Examiner*—Alpus H. Hsu
*Attorney, Agent, or Firm*—Harold McGurk

[57] ABSTRACT

These methods allow payload control instructions to be transported to satellites in a constellation of satellites and to be activated at pre-assigned times across the constellation. These methods manage and distribute validated payload instructions according to an associated time-tag. The payload instruction methods support direct payload control as well as incremental table updates. The primary functions performed by the payload instruction methods include appending payload instructions to tables, replacing or deleting specific payload instruction in a table, and scheduling and distributing the execution of payload instructions according to an attached time-tag.

18 Claims, 6 Drawing Sheets

METHODS FOR MANAGING AND DISTRIBUTING PAYLOAD INSTRUCTIONS

RELATED INVENTIONS

This application is related to U.S. patent application Ser. No. 08/279,729 filed on Jul. 25, 1994 and entitled "INTER-SATELLITE METHOD FOR ROUTING PACKETS", and to U.S. patent application Ser. No. 08/300,546 filed on Sep. 6, 1994, and entitled "METHOD OF RECONSTRUCTING AND DELIVERING SEGMENTED MESSAGES". Both patent applications are assigned to the same assignee of the present application.

FIELD OF THE INVENTION

This invention relates generally to telecommunication systems and, in particular, to methods for managing and distributing payload instructions.

BACKGROUND OF THE INVENTION

Current command protocols in satellite-based telecommunication systems are not suited for transporting, storing and executing payload control instructions. Most conventional satellite systems operate from a centralized, mission-unique command architecture. Such architectures provide at most a low level of standardization. One command standard, the Consultative Committee for Space Data Systems (CCSDS) Telecommand Data System Standard, defines a fully layered service, principally specifying the transport and physical layers. However, it does not specify the format and operations of the data management layer. The CCSDS standard and other known technologies do not support synchronous control of a large number of non-synchronous orbiting satellites in a packet-switched network.

Accordingly, there is a significant need for methods for managing and distributing payload instructions in a satellite-based telecommunication system.

DESCRIPTION OF THE PREFERRED EMBODIMENTS

The rapidly changing orientation of a constellation of satellites in a packet-switched network relative to the fixed locations of the users on the earth requires constantly changing network and packet-routing resources. This, in turn, necessitates distributed, semi-autonomous and pre-planned network operations on-board the spacecraft under control of a network management entity. The nature of the IRIDIUM® network allows direct communication to satellite control ground stations only during short periods of time. At the same time, the network requires synchronous changes to the network resource operating parameters at all spacecraft and network ground nodes. This method allows payload control instructions to be transported to the network nodes for activation at pre-assigned times across the network.

A "satellite" means a man-made object or vehicle intended to orbit a celestial body such as the earth. The term "satellite" is intended to include both geostationary and orbiting satellites and/or combinations thereof including low-earth orbiting (LEO) satellites. The word "earth" is intended to include any celestial body around which a communication satellite may orbit. A "constellation" means an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. The terms "cell" and "antenna pattern" are not intended to be limited to any particular mode of generation and include those created by either terrestrial or satellite cellular communication systems and/or combinations thereof.

Figure 1:
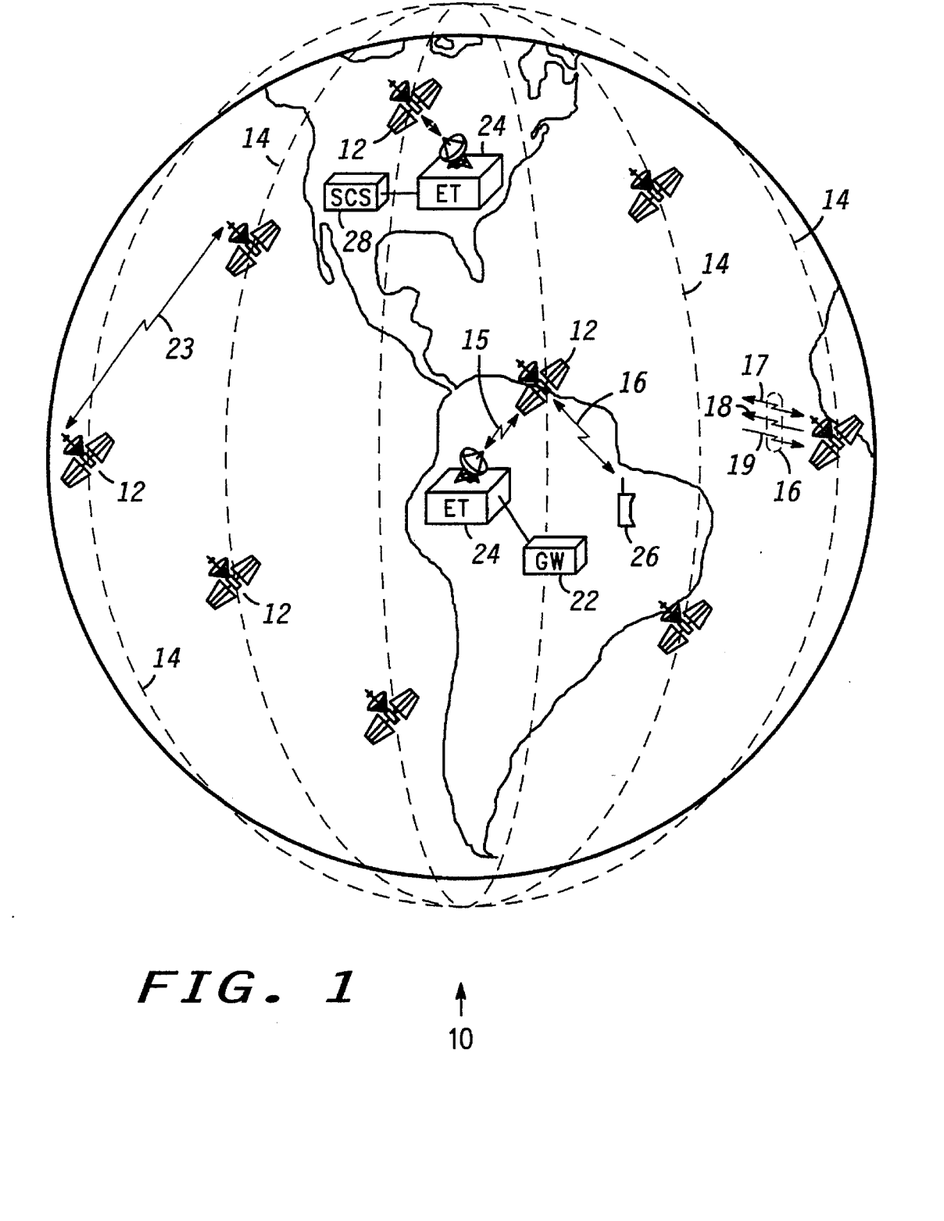
FIG. 1 depicts a highly simplified diagram of a satellite-based communication system of which the present invention may form a portion thereof.

FIG. 1 illustrates a highly simplified diagram of satellite-based communication system 10, dispersed over and surrounding earth through use of orbiting satellites 12 occupying orbits 14. The present invention is applicable to communication systems including satellites having low-earth and medium-earth orbits. Additionally, it is applicable to orbits having any angle of inclination (e.g., polar, equatorial or another orbital pattern).

Communication system 10 uses six polar orbits 14, with each orbit 14 having eleven satellites 12 for a total of sixty-six satellites 12. Although this is preferred, it is not essential because more or fewer satellites, or more or fewer orbits, may be used. While the present invention is advantageously employed when a large number of satellites are being used, it is also applicable with as few as a single satellite. For clarity, FIG. 1 illustrates only a few of satellites 12 of the constellation.

For example, each orbit 14 encircles earth at an altitude of around 780 km, although higher or lower orbital altitudes may be usefully employed. Due to the relatively low orbits of satellites 12, substantially line-of-sight electromagnetic (e.g., radio, light etc.) transmission from any one satellite 12 or reception of signals by any one satellite 12 covers a relatively small area of earth at any instant. For the example shown, satellites 12 travel with respect to earth at around 25,000 km/hr, allowing satellite 12 to be visible to a terrestrial station or ISUs 26 for a period of approximately nine minutes.

Satellites 12 communicate with terrestrial stations which may include some number of radio communication individual subscriber units (ISUs) 26 and earth terminals (ETs) 24 connected to system control segment (SCS) 28. SCS 28 may be a base station, for example. ETs 24 may also be connected to gateways (GWs) 22 which provide access to a public switched telephone network (PSTN) or other communications facilities. Only one each of GWs 22, SCSs 28 and ISUs 26 are shown in FIG. 1 for clarity and ease of understanding. ETs 24 may be co-located with or separate from SCS 28 or GW 22. ETs 24 associated with SCSs 28 receive data describing status of satellites 12 and GWs 22 and relay packets of control information. ETs 24 associated with GWs 22 primarily receive and relay packets relating to calls in progress from/to ISUs 26 and satellites 12.

ISUs 26 may be located anywhere on the surface of the earth or in the atmosphere above the earth. ISUs 26 are preferably communications devices capable of transmitting data to and receiving data from satellites 12. By way of example, ISUs 26 may be hand-held, portable cellular telephones adapted to communicate with satellites 12. Ordinarily, ISUs 26 need not perform any control functions for communication system 10.

Communication system 10 may accommodate any number, potentially in the millions, of ISUs 26. In the preferred embodiments of the present invention, ISUs 26 communicate with nearby satellites 12 via subscriber links 16. Links 16 encompass a limited portion of the electromagnetic spectrum that is divided into numerous channels. Links 16 are preferably combinations of L-Band and/or K-Band frequency channels and may encompass Frequency Division Multiple Access (FDMA) and/or Time Division Multiple Access (TDMA) and/or Code Division Multiple Access (CDMA) communications or combinations thereof. At a minimum, satellite 12 regularly transmits over one or more broadcast channels 18. ISUs 26 synchronize to broadcast channels 18 and monitor broadcast channels 18 to detect data messages which may be addressed to them. ISUs 26 may transmit messages to satellites 12 over one or more acquisition channels 19. Broadcast channels 18 and acquisition channels 19 are not dedicated to any one ISU 26 but are shared by all ISUs 26 currently within view of a satellite 12.

On the other hand, traffic channels 17 are two-way channels that are assigned to particular ISUs 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, at a minimum, a two-way voice conversation. To support real-time communications, a time division multiple access (TDMA) scheme is desirably used to divide time into frames, preferably in the 10–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a number of independent calls. Those skilled in the art, however, will recognize that traffic channels can be formed without this time slot structure and that methods that do not require digitizing the analog voice signal may be employed. The precise method used to form the channels and process the voice communication is not important to this invention.

Satellites 12 communicate with other nearby satellites 12 through cross-links 23. Thus, a call or communication from an ISU 26 located at any point on or near the surface of the earth may be routed through the constellation of satellites 12 to within range of substantially any other point on the surface of the earth. A communication may be routed down to an ISU 26 on or near the surface of the earth from a satellite 12 using subscriber link 16. Alternatively, a communication may be routed down to or up from any of many ETs 24, of which FIG. 1 shows only two, through earth links 15. ETs 24 are usually distributed over the surface of the earth in accordance with geo-political boundaries. In the preferred embodiments, each satellite 12 may communicate with up to four ETs 24 and over a thousand ISUs 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communication systems, such as the PSTN, may access communication system 10 through GWs 22.

With the example constellation of sixty-six satellites 12, at least one of satellites 12 is within view of each point on the earth's surface at all times, resulting in full coverage of the earth's surface. Any satellite 12 may be in direct or indirect data communication with any ISU 26 or ET 24 at any time by routing data through the constellation of satellites 12. Accordingly, communication system 10 may establish a communication path for relaying data through the constellation of satellites 12 between any two ISUs 26, between SCS 28 and GW 22, between any two GWs 22 or between ISU 26 and GW 22.

The present invention is also applicable to satellite constellations where full coverage of the earth is not achieved (i.e., where there are "holes" in the communications coverage provided by the constellation) and constellations where plural coverage of portions of the earth occur (i.e., more than one satellite is in view of a point on the earth's surface).

In general terms, communication system 10 may be viewed as a network of nodes. Each satellite 12, GW 22, and ISU 26 represents a node of communication system 10. All nodes of communication system 10 are or may be in data communication with other nodes of communication system 10 through communication links 15, 16, and/or 23. In addition, all nodes of communication system 10 are or may be in data communication with other telephonic devices dispersed throughout the world through PSTNs and/or conventional terrestrial cellular telephone devices coupled to the PSTN through conventional terrestrial base stations.

The present invention is applicable to satellite constellations communicating to paging ISUs, as well as voice and paging ISUs.

Payload instructions are defined as scheduled payload control. Payload instructions are used by the SCS (see FIG. 1) to schedule and control elements of the telecommunication system that may change periodically as the satellite constellation changes. Payload instructions are scheduled via a time-tag that indicates when the payload instruction will be loaded into a space vehicle. The payload control instructions are stored on-board a space vehicle (SV) or a satellite.

There are several different payload instruction types. As part of normal system operation scheduling, the SCS generates a payload instruction list (PIL) for each payload instruction type and for each space vehicle. Each PIL comprises a time-ordered sequence of payload instructions that are transmitted to the SVs. The PIL will preferably cover a period of 24 hours.

There are a variety of payload instruction lists (PIL), such as beam allocation, candidate beam list, ring alert table, routing table and feeder link schedule, for example. The system definition of each list specifies the number of bytes in the parameter field ("parameter set"), and whether or not multiple parameter fields are allowed. For some lists, the number of bytes in the parameter field may be fixed or variable.

Figure 2:
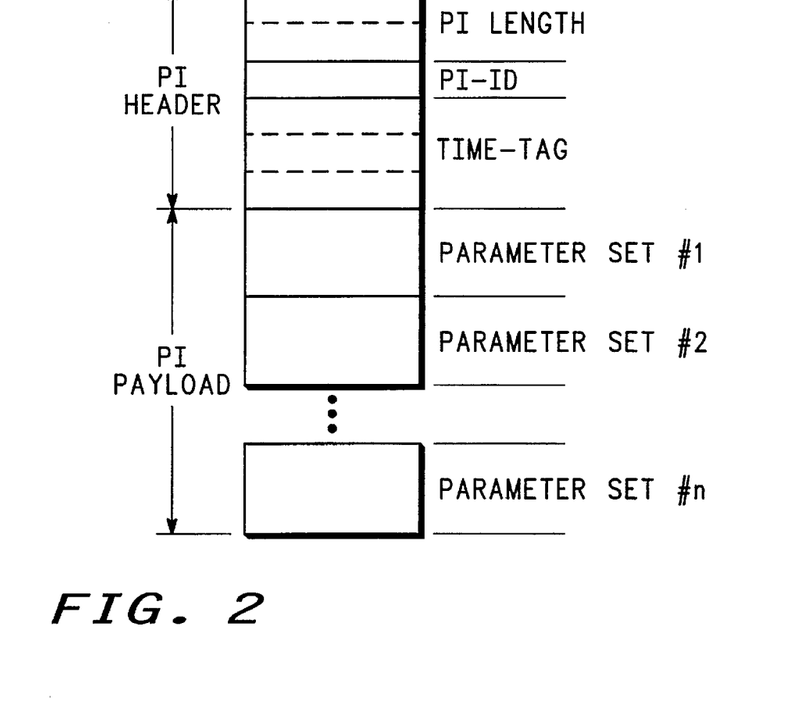
FIG. 2 shows a format of a payload instruction in accordance with a preferred embodiment of the present invention.

FIG. 2 shows a format of a payload instruction (PI) in accordance with a preferred embodiment of the present invention. As shown in FIG. 2, there is a PI header and a PI payload. The PI header comprises PI length, PI-ID, and a time-tag. The PI length indicates the length of the payload instruction. PI-ID identifies the payload instruction as a member of a specific payload instruction list as defined in the on-board payload instruction database. The time-tag specifies when the payload instruction is to take effect. The time-tag preferably is counted using L-band frame counts (satellite time units).

The PI payload comprises parameters sets 1 through n, where n is greater or equal to 1. The parameters are the PI modifiers that define specific instruction variables necessary to perform communication operations. A payload instruction comprises in addition to the PI header one or more sets of payload instruction parameters carried in the PI payload. In the PI payload, all operations defined in a single payload instruction containing multiple parameter fields are to be executed preferably in the same L-band frame. An example of multiple parameters is an update of two or more entries in an operational table occurring in the same L-band frame. For each unique payload instruction defined by a PI-ID, there is a PI executor in the satellite that understands the semantics of the parameters and how to handle multiple parameter fields, if allowed.

Figure 3:
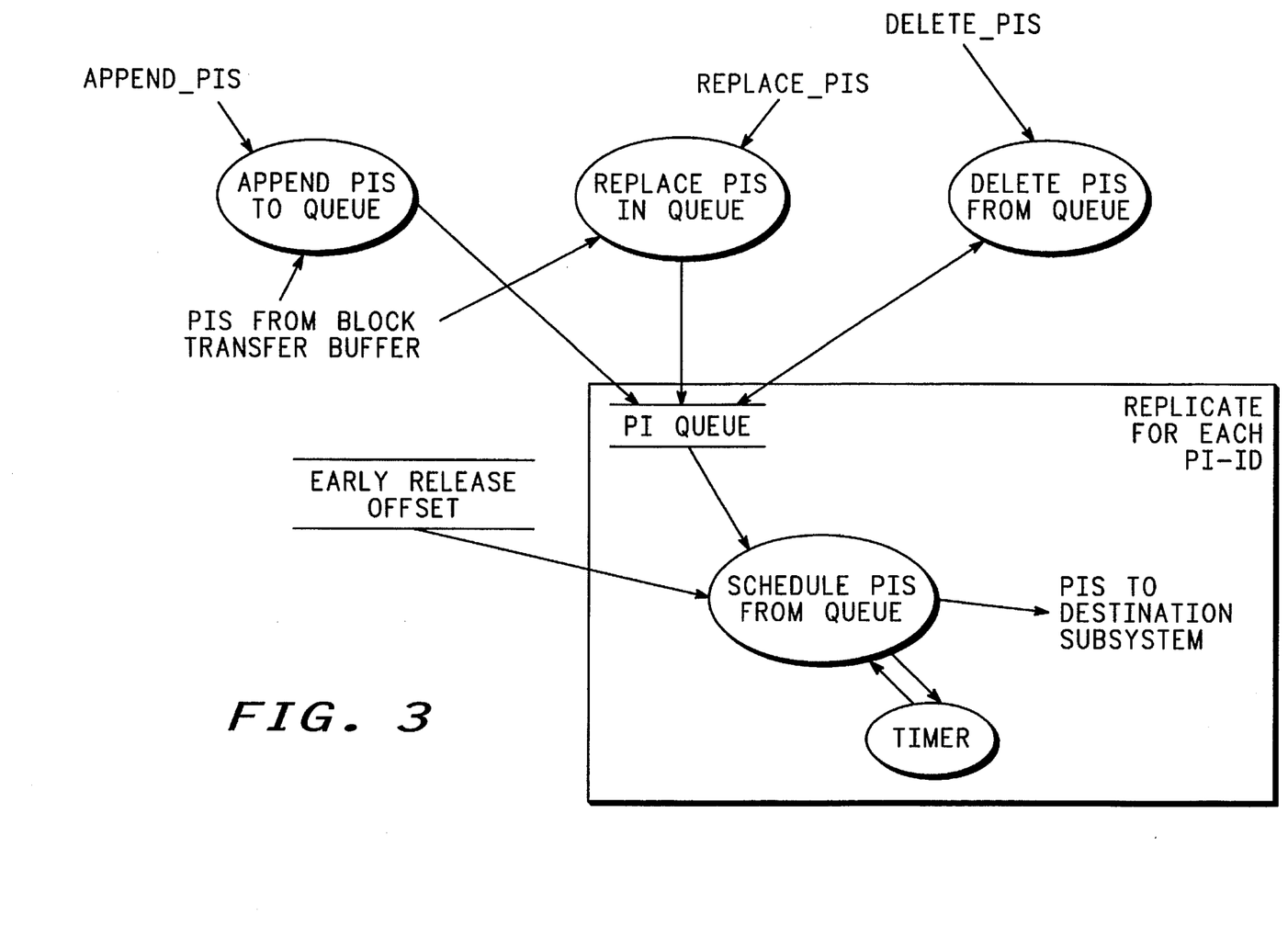
FIG. 3 shows data flows associated with each of the main functions of a payload instruction process in accordance with a preferred embodiment of the present invention.

FIG. 3 shows data flows associated with each of the main functions of a payload instruction process in accordance with a preferred embodiment of the present invention. The main functions are append, replace, delete and schedule payload instructions. The heavy arrows in FIG. 3 show the flow of payload instructions, while the lighter lines show the flow of the other data and control. The ellipses ("bubbles") represent functions and the parallel lines represent data stores. Preferably, the function bubbles and data stores in the shaded area are replicated once for each payload instruction type defined in the system.

Two data stores are shown in FIG. 3: "PI Queue" and "Early Release Offset". "PI Queue" stores payload instructions for distribution. There is a "PI Queue" for each payload instruction type. "Early Release Offset" is a configurable item for each payload instruction type and specifies how many L-Band frames early the payload instruction is to be sent to its destination.

Ordinarily, payload instructions will be uploaded to the SV on a regular basis using the block transfer facility, followed by a command to append the payload instructions to an existing queue. Some payload instruction lists, due to their large size, will require several block transfer uploads and schedule commands. Other payload instruction lists may be small enough to be transferred together in one block transfer. In this case, separate append commands for each payload instruction list will be required after the block transfer.

Replans may be necessary in the event of failures or unplanned network operational conditions. The SCS can use one of two ways for replacing current payload instructions with replans. The first way is to use the delete and schedule commands and the second is to use the replace command. The SCS shall be responsible for error recovery while uploading, processing or distributing payload instructions. Other methods of error recovery could be used (such as error correcting codes in the satellites).

Figure 4:
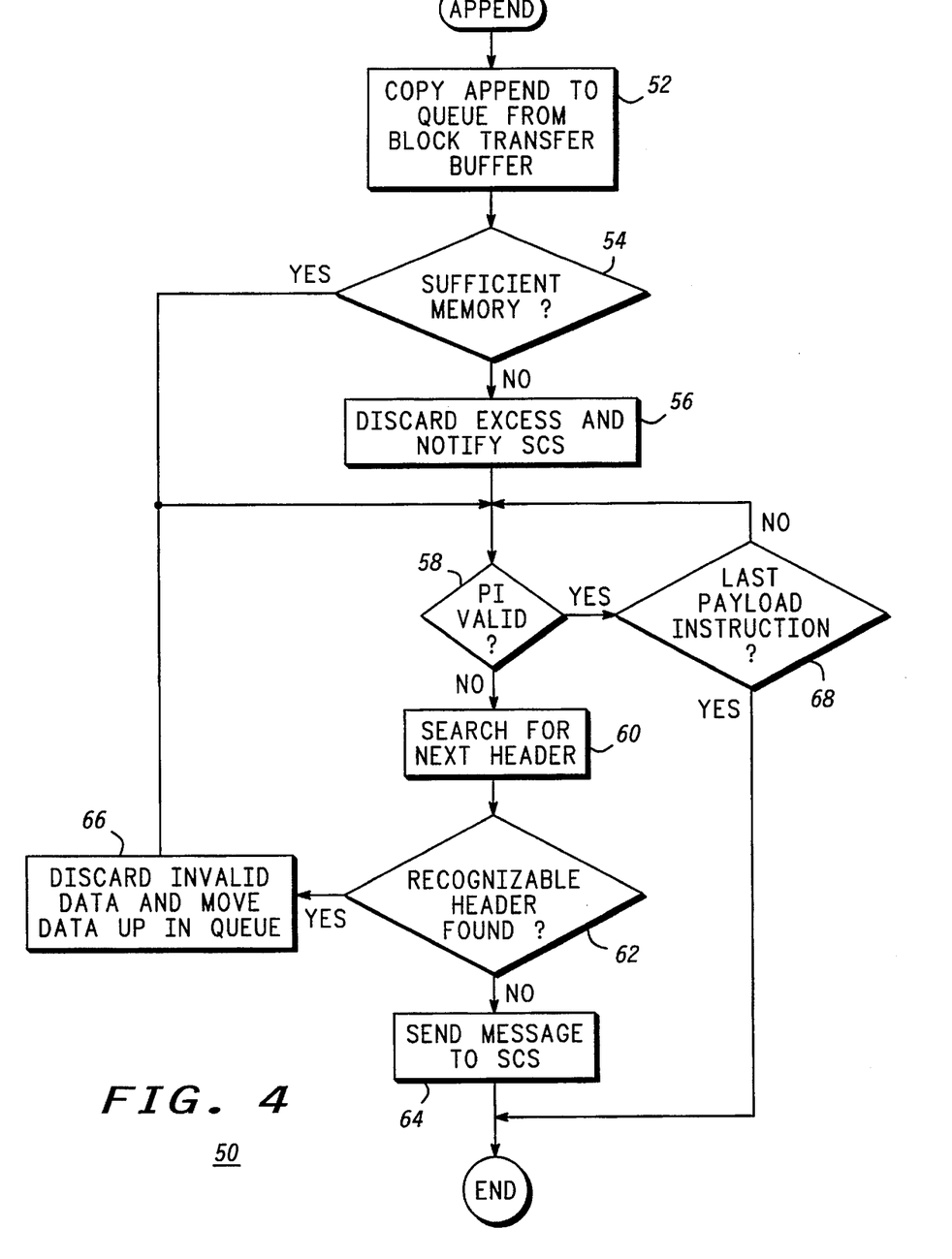
FIG. 4 shows a flowchart of a method for executing an append function in accordance with a preferred embodiment of the present invention.

FIG. 4 shows a flowchart of a method for executing an append function in accordance with a preferred embodiment of the present invention. Prior to activating method 50, the SCS must have transmitted and stored payload instructions in the block transfer buffer. The SCS is capable of sending one PIL (payload instruction list), a PIL segment or multiple PILs to the SV using a block transfer. A PIL segment is sent when a PIL exceeds the capacity of a single block transfer upload. Multiple PILs can be sent when several PILs are transmitted together in a single block transfer.

There is no synchronization between the SV and the SCS. In other words, the SCS neither knows when the block transfer is completed nor when method 50 has moved the data from the block transfer buffer. The SCS must wait a sufficient amount of time before sending more PILs. Although block transfer operations are preferred, other ways of transmitting the PILs from the SCS to the SV may be used as well.

According to FIG. 4, append method 50 begins in step 52 by copying the payload instructions contained in the block transfer queue to an appropriate payload instruction queue. Method 50 next determines in step 54 whether there is sufficient memory capacity or size in the queue for the payload instructions. If there is sufficient memory capacity, method 50 advances to step 58. Otherwise, if there is insufficient memory capacity, method 50 in step 56 discards the excess payload instructions and notifies the SCS of the overflow. The SCS will determine which payload instructions were discarded based on the contents of the notification message. The SCS will reschedule the upload of the discarded payload instructions at a later time when sufficient memory capacity becomes available by the normal payload instruction distribution process.

Method 50 next determines in step 58, starting with the first payload instruction added to the queue, whether the payload instruction is valid. Validation involves, for example, making sure that the payload instruction has a correct PI-ID, is in chronological order, and has no bit errors. If method 50 becomes unsynchronized with the payload instructions (i.e., loses track of which word is a payload instruction header), method 50 will attempt in step 60 to resynchronize by searching for the next recognizable header and verifying in step 62 that there is another recognizable header. If a recognizable header cannot be found in the remainder of the queue, method 50 sends in step 64 an error message to the SCS, discards all invalid data, and method 50 ends. Otherwise, if a recognizable header is found in step 62, method 50 will discard invalid data in step 66, move data up in the queue, and return to step 58 to determine whether the payload instruction is valid.

After method 50 determines that the first payload instruction added to the queue is valid in step 58, method 50 determines in step 68 whether there were any more payload instructions added to the queue. If there are more payload instructions, method 50 returns to step 58 to validate the next payload instruction. This loop will continue until all payload instructions added to the queue are validated. After all payload instructions in the list are validated, method 50 ends. The SCS activates the append function by issuing a separate append command for each PI type contained in the upload.

Figure 5:
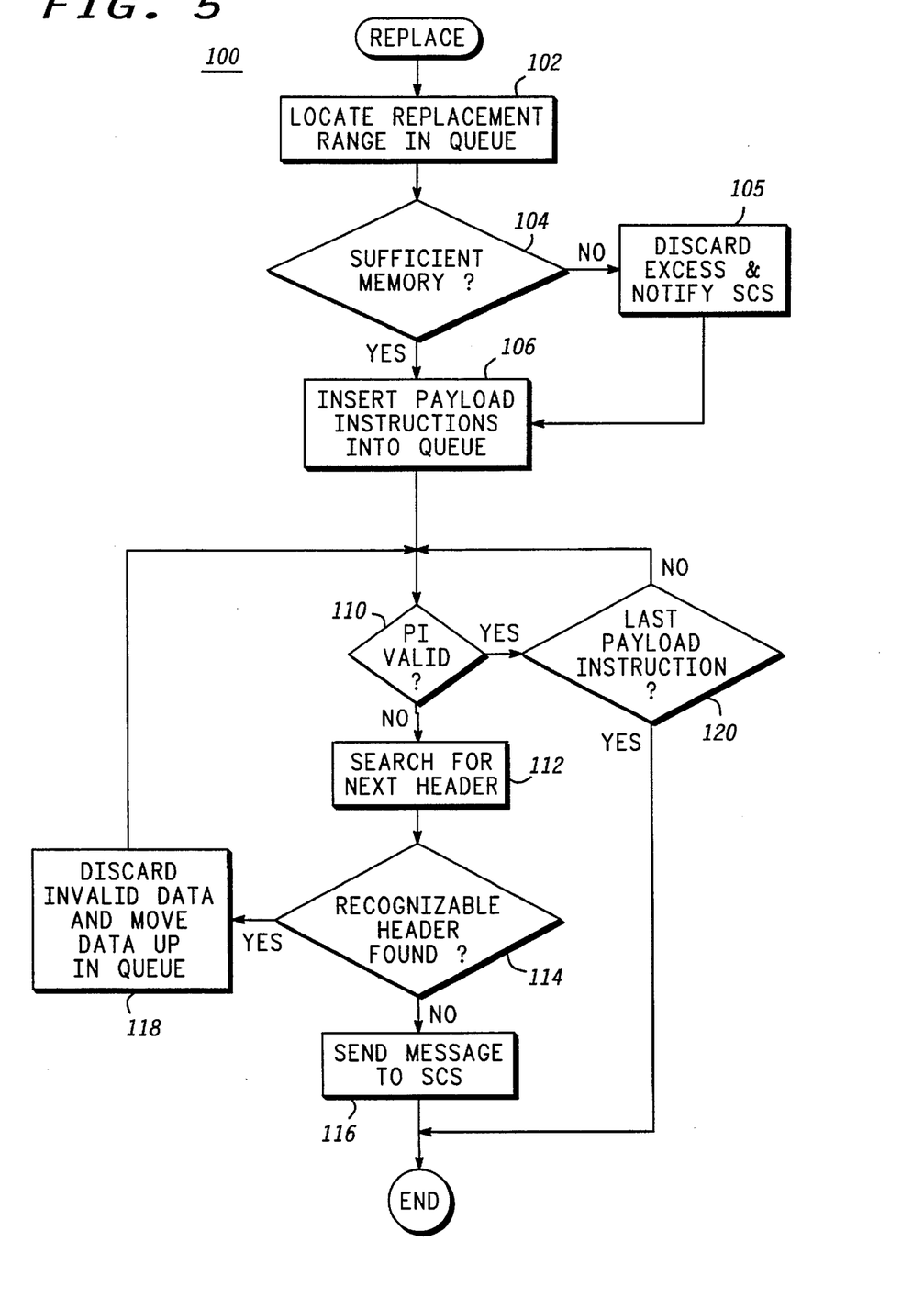
FIG. 5 shows a flowchart of a method for executing a replace function in accordance with a preferred embodiment of the present invention.

FIG. 5 shows a flowchart of a method for executing a replace function in accordance with a preferred embodiment of the present invention. When a few of the payload instructions are replaced, one or more ranges within the existing payload instruction queue are deleted and replaced with the new payload instructions. Replacing payload instructions applies where the problem affects a limited time range or a small number of time ranges.

When payload instructions are being replaced, a location (offset) in the block transfer buffer and length of the range is specified in addition to $T_{start}$ and $T_{stop}$. The two time values, $T_{start}$ and $T_{stop}$, are specified to bound the range of payload instructions time-tags that are to be deleted. The time range specified by the bounds is inclusive, i.e., $T_{start} \leq TT_{PIs}$ to be deleted $\leq T_{stop}$. This means that any payload instruction whose time-tag matches or is between the given times will be replaced by the supplied payload instructions.

The parameters required by the command allow the command to be used for insertion, deletion, appending (top or bottom of queue) and replacement of a set of payload instructions.

To insert payload instructions, the replace command must specify start and stop times that are between two adjacent payload instruction time-tags. No payload instructions will be deleted, and the uploaded payload instructions will be inserted between those two adjacent payload instructions. If the insertion will cause an attempt to replace payload instructions beyond the end of the queue, the payload instructions that would go at the end of the queue will be deleted. A message will be sent to the SCS notifying the SCS that there is insufficient memory capacity.

To delete specific payload instructions, the replace command must specify the start and stop time and make the length of the replacement range to be zero. The payload instructions in the queue whose time-tags are between the start and stop time will be deleted. The deleted payload instructions will not be replaced.

To append to the front of a queue, the replace command must specify start and stop times that are before the first time-tag in the queue. The payload instructions in the queue will be moved down to make room for the new payload instructions. The new payload instructions will be written to that space. If the move causes an attempt to write past the end of the queue, those payload instructions that would belong at the end of the queue will be discarded. A message would be sent to the SCS notifying the SCS that there is insufficient memory capacity.

To append to an end of a queue, the replace command specifies start and stop times that are after the last time-tag in the queue. The replacement payload instructions will be written at the bottom of the queue. If writing payload instructions to the queue causes an attempt to write past the end of the queue, those payload instructions that would belong past the end of the queue will be discarded. A message would be sent to the SCS notifying the SCS that there is insufficient memory capacity.

To delete a specific payload instruction, the replace command must specify start and stop times that are equal. The SV will search for the first occurrence of that specific time-tag (rather than searching for an equal or greater than condition) and delete that occurrence if found. This operation is useful where a payload instruction time-tag somehow got out of sequence (and the SCS knows the value of the time-tag) and needs to be deleted.

FIG. 5 shows the flowchart for replacing payload instructions. Prior to executing method 100, the SCS must have put the replacement payload instructions in the block transfer buffer. The SCS activates method 100 by issuing a replace command specifying payload instruction queue and the replacement time range (i.e., $T_{start}$ and $T_{stop}$). In general, method 100 finds the position in the queue where the payload instructions are to be written, moves unaffected payload instructions in the queue to make enough room for the new payload instructions and then copies the payload instructions from the block transfer buffer to the newly created space.

According to FIG. 5, replace method 100 begins in step 102 by locating the replacement range in a specified queue. The replacement range is based on the specified payload instruction time-tags. Method 100 next creates in step 104 a memory gap for accepting the new payload instruction and determines whether there is insufficient memory capacity to store the payload instructions. If an insufficient memory capacity condition occurs, the SV will discard the excess payload instructions at the end of the queue and notify the SCS. Upon notification of the insufficient memory capacity condition in step 106, the SCS must determine which payload instructions were discarded. The SCS may reschedule the upload of the discarded payload instructions at a later time when sufficient memory capacity becomes available by the normal payload instruction distribution process.

If sufficient memory capacity exists, method 100 moves in step 108 the payload instructions from the block transfer buffer to the replacement range in the queue.

Method 100 next determines in step 110, starting with the first payload instruction added to the queue, whether the payload instruction is valid. Validation involves, for example, making sure that the payload instruction has a correct PI-ID, is in chronological order, and has no bit errors. If method 100 become unsynchronized with the payload instructions (i.e., loses track of which word is a payload instruction header), method 100 will attempt in step 112 to resynchronize by searching for the next recognizable header and verifying in step 114 that there is another recognizable header. If a recognizable header cannot be found in the remainder of the queue, method 100 sends in step 116 an error message to the SCS, discards all invalid data, and lastly, method 100 ends. Otherwise, if a recognizable header is found in step 114, method 100 will discard the invalid data in step 118, move data up in the queue, and return to step 110 to determine whether the payload instruction is valid.

After method 100 determines that the first payload instruction added to the queue is valid in step 110, method 100 determines in step 120 whether there are any more payload instructions added to the queue. If there are more payload instructions, method 100 returns to step 110 to validate the next payload instruction. This loop will continue until all of the payload instructions added to the queue are validated. After all payload instructions in the list are validated, method 100 ends.

Figure 6:
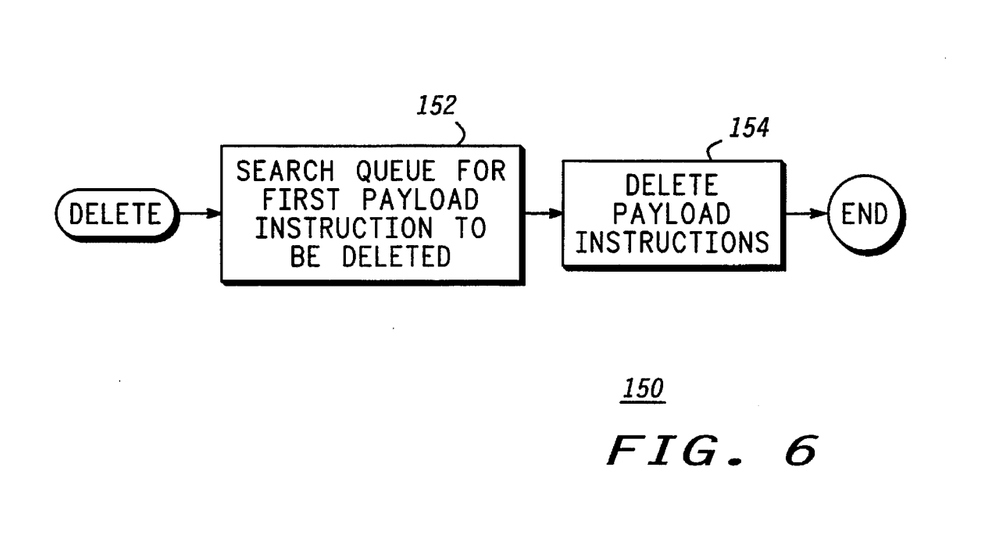
FIG. 6 shows a flowchart of a method for executing a delete function in accordance with a preferred embodiment of the present invention.

FIG. 6 shows a flowchart of a method 150 for executing a delete function in accordance with a preferred embodiment of the present invention. The delete command when issued by the SCS deletes all payload instructions from a given point in the PI queue to the end of the queue. The SCS sends a delete command that includes a time-tag. Based on the time-tag, the delete method 150 first locates in step 152 the point in the PI queue of the first payload instruction to be deleted and makes that point the end of the queue. Thus, all payload instructions are deleted in step 154 from the time-tag to the end of the queue by moving the end-of-queue pointer.

Figure 7:
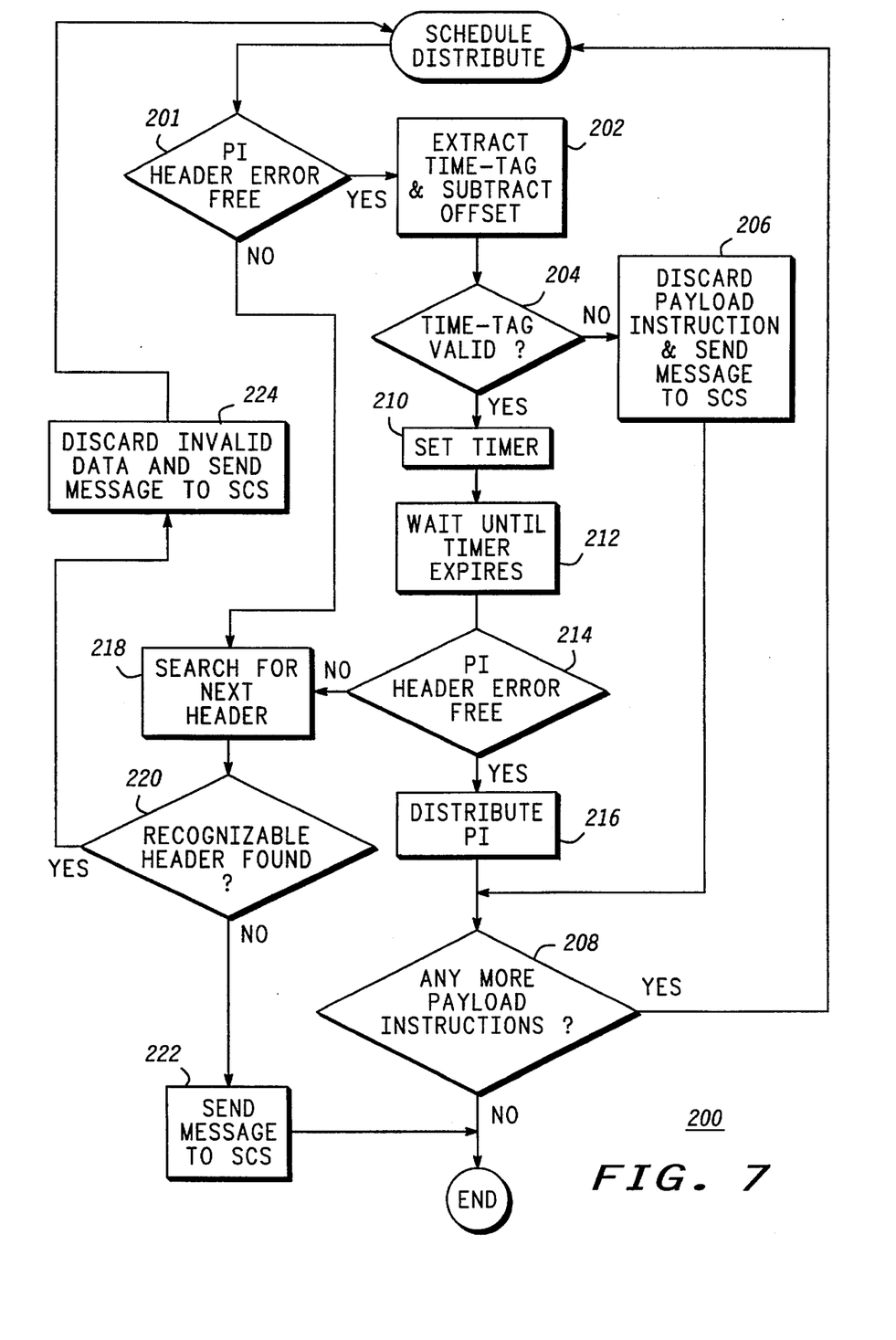
FIG. 7 shows a flowchart of a method for executing a schedule/distribute function in accordance with a preferred embodiment of the present invention.

FIG. 7 shows a flowchart of a method 200 for executing a schedule/distribute function in accordance with a preferred embodiment of the present invention. Method 200 begins in step 202 by extracting a time-tag from a payload instruction which is at the top of the queue. A time offset is then subtracted from the time-tag to allow an early distribution of the payload instruction. Method 200 then checks in step 204 whether the modified time-tag is valid by determining whether the time-tag is more than x number of L-band frames old ("x" is a predetermined and configurable number). If the time-tag is invalid, method 200 discards the current payload instruction from the queue and sends a message to the SCS. Method 200 next checks in step 208 whether there are any more payload instructions. If there are no more payload instructions, method 200 ends. Otherwise, method 200 returns to steps 201 and 202 to extract another time-tag and determine its validity in step 204. This loop will continue until a valid time-tag is found in a subsequent payload instruction or the queue does not contain any more payload instructions.

Once a valid time-tag is found in step 204, method 200 sets a timer in step 210. The timer is set according to the modified time-tag. Method 200 waits in step 212 until the timer expires. After the timer expires, method 200 determines in step 214 whether the payload instruction header is error-free. If the payload instruction header is error-free, method 200 distributes or sends the payload instruction to a destination subsystem. Thereafter, method 200 goes to step 208 to determine if there are any remaining payload instructions in the queue. Method 200 continues until all payload instructions are distributed or found to be in error.

If the payload instruction is found to be in error in step 214, method 200 will attempt in step 218 resynchronize by searching for the next recognizable header and verifying in step 220 that there is another recognizable header. If a recognizable header cannot be found in the remainder of the queue, method 200 discards the invalid data in step 222 and sends an error message to the SCS. Otherwise, if a recognizable header is found in step 220, method 200 will discard invalid data in step 224 and return to steps 201 and 202 to extract another time-tag from the payload instruction at the top of the queue. The payload instruction is typically executed by the destination to take effect at the original time-tag value.

It will be appreciated by those skilled in the art that in the present invention, methods are provided for managing and distributing payload instructions. These payload instruction functions or methods support direct payload control as well as incremental table updates. Moreover, payload instructions are distributed to subsystems at time prior to or equal to the attached time-tag.

It is an advantage of the present invention to synchronize execution of payload instructions across the constellation by an early distribution of payload instructions to account for setup time. It is another advantage of the present invention to update one or more incremental control instructions into one payload instruction for execution at a specified time. It is also an advantage of the present invention to transport simultaneously multiple payload instructions with execution times distributed over a long period of time. Yet another advantage of the present invention is to provide an increased efficiency in bandwidth and on-board storage of payload control instructions by allowing multiple incremental updates to operational tables to be transported to each satellite in the constellation. Moreover, another advantage is to provide methods for the simultaneous and synchronous execution of one of more payload instructions by the large number of spacecraft in the constellation.

What is claimed is:

1. A method executed by a satellite for distributing a plurality of payload instructions to a plurality of subsystems in the satellite, the satellite capable of communicating with a base station, each of the payload instructions including an attached time-tag that specifies when a payload instruction is to be activated, the method comprising the steps of:

(a) receiving a plurality of payload instructions;

(b) determining whether each of the payload instructions is valid; and (c) distributing each of the payload instructions found to be valid in step (b) to a subsystem of the satellite according to an attached time-tag.

2. A method as recited in claim 1, wherein step (a) comprises the steps of:

a1) receiving the payload instructions into a block transfer buffer; and a2) copying the payload instructions from the block transfer buffer into a queue.

3. A method as recited in claim 2, wherein step (b) comprises the steps of:

b1) determining whether the queue has sufficient memory capacity for storing the payload instructions; and b2) discarding from the queue any payload instructions exceeding the memory capacity and notifying the base station if the queue does not have sufficient memory capacity.

4. A method as recited in claim 1, wherein step (b) comprises the steps of:

b1) searching for a recognizable header of one of the payload instructions from a queue if an invalid payload instruction is found;

b2) discarding any invalid payload instructions from the queue if the recognizable header is found; and b3) notifying the base station if the recognizable header cannot be found.

5. A method as recited in claim 1, wherein step (c) comprises the steps of:

c1) locating a replacement range in a queue;

c2) determining whether the queue has sufficient memory capacity for storing the payload instructions; and c3) replacing the payload instructions in the queue according to the replacement range.

6. A method as recited in claim 5, wherein step (c) further comprises the step of discarding any payload instructions which would cause the memory capacity of the queue to be exceeded when the payload instruction are replaced and notifying the base station if the queue does not have sufficient memory capacity.

7. A method as recited in claim 5, wherein step (c) further comprises the steps of:

c4) searching in the queue for a recognizable header of one of the payload instructions if step (b) finds an invalid payload instructions;

c5) discarding from the queue invalid payload instructions by repeating steps (c1)–(c3) until the recognizable header is found; and c6) notifying the base station if the recognizable header cannot be found.

8. A method as recited in claim 1, wherein a command is sent from the base station to the satellite, the command includes a first payload instruction to be deleted and an end-of-queue pointer, and wherein step (c) comprises the steps of:

c1) searching for the first payload instruction to be deleted in a queue comprising previously stored payload instructions; and c2) deleting payload instructions in the queue based on the first payload instruction to be deleted and the end-of-queue pointer.

9. A method as recited in claim 1, wherein step (c) comprises the step of transporting the payload instructions to one of the subsystems of the satellite for activation at pre-assigned times.

10. A method as recited in claim 1, wherein step (c) comprises the steps of:

c1) extracting an attached time-tag for each of the payload instructions;

c2) determining whether each of the attached time-tags is valid;

c3) setting a timer according to a first of the attached time-tags;

c4) waiting until the timer expires before distributing the payload instruction associated with the first of the attached time-tags to one of the subsystems of the satellite; and c5) repeating steps (c3) and (c4) for each of the attached time-tags until all of the payload instructions have been distributed.

11. A method as recited in claim 10, wherein step (c) further comprises the step of discarding a payload instruction associated with an invalid attached time-tag and notifying the base station that the payload instruction has an invalid time-tag.

12. A method executed by each of a plurality of satellites for distributing a plurality of payload instructions to a plurality of subsystems in each of the satellites, the satellites capable of communicating with a plurality of base stations, each of the payload instructions including an attached time-tag that specifies when a payload instruction is to be activated, the method comprising the steps of:

(a) each of the satellites receiving a plurality of payload instructions from at least one of the base stations;

(b) each of the satellites determining whether each of the payload instructions is valid;

(c) each of the satellites distributing each of the payload instructions found to be valid in step (b) to a subsystem in each of the satellites according to an attached time-tag; and (d) each of the satellites synchronizing execution of the payload instructions across the satellites based on the attached time-tags.

13. A method as recited in claim 12, wherein step (c) comprises the step of transporting the payload instructions to each of the subsystems of the satellites for activation at pre-assigned times.

14. A method executed by a satellite for distributing a plurality of payload instructions to a plurality of subsystems in the satellite, the satellite capable of communicating with a base station, each of the payload instructions including an attached time-tag that specifies when a payload instruction is to be activated, the method comprising the steps of:

a) receiving a plurality of payload instructions;

b) determining whether a queue has sufficient memory capacity for storing the payload instructions;

c) discarding from the queue any payload instructions exceeding the memory capacity and notifying the base station if the queue does not have sufficient memory capacity;

d) determining whether each of the payload instructions is valid;

e) searching in the queue for a recognizable header of one of the payload instructions if an invalid payload instruction is found;

f) discarding from the queue invalid payload instructions if the recognizable header is found;

g) notifying the base station if the recognizable header cannot be found; and h) distributing each of the payload instructions found to be valid in step (d) to a subsystem of the satellite according to an attached time-tag.

15. A method as recited in claim 14, wherein step (h) comprises the steps of:

h1) locating a replacement range in a queue;

h2) determining whether the queue has sufficient memory capacity for storing the payload instructions; and h3) replacing the payload instructions in the queue according to the replacement range.

16. A method as recited in claim 15, wherein step (h) further comprises the steps of:

h4) searching in the queue for a recognizable header of one of the payload instructions if step (d) finds an invalid payload instructions;

h5) discarding from the queue invalid payload instructions by repeating steps (h1)–(h3) until the recognizable header is found; and h6) notifying the base station if the recognizable header cannot be found.

17. A method as recited in claim 14, wherein step (h) comprises the steps of:

h1) extracting an attached time-tag from each of the payload instructions;

h2) determining whether each of the attached time-tags is valid;

h3) setting a timer according to the attached time-tag; and h4) waiting until the timer expires before distributing the associated payload instruction to the subsystem of the satellite.

18. A method as recited in claim 17, wherein step (h) further comprises the step of discarding a payload instruction associated with an invalid time-tag and notifying the base station that the payload instruction has the invalid time-tag.

* * * * *